United States Patent
Drucker

(10) Patent No.: US 12,079,387 B2
(45) Date of Patent: Sep. 3, 2024

(54) HAND INTERFACE DEVICE

(71) Applicant: Sam Drucker, Plantation, FL (US)

(72) Inventor: Sam Drucker, Plantation, FL (US)

( * ) Notice: Subject to any disclaimer, the term of this patent is extended or adjusted under 35 U.S.C. 154(b) by 0 days.

(21) Appl. No.: 17/860,067

(22) Filed: Jul. 7, 2022

(65) Prior Publication Data

US 2023/0070077 A1 Mar. 9, 2023

Related U.S. Application Data

(60) Provisional application No. 63/219,016, filed on Jul. 7, 2021.

(51) Int. Cl.
*G06F 3/01* (2006.01)
(52) U.S. Cl.
CPC .................................. *G06F 3/014* (2013.01)
(58) Field of Classification Search
CPC ...... G06F 1/163; G06F 1/1626; G06F 1/1637; G06F 1/1643; G06F 1/165; G06F 1/1652; G06F 1/1654; G06F 1/1684; G06F 1/169; G06F 1/1692; G06F 15/0216; G06F 3/014; G06F 3/016; G06F 3/03547; G06F 3/0421; G06F 2203/0331; G06F 3/039; G06F 3/0393; A44C 9/0053; A44C 9/02; H04M 1/7243; H04M 1/72433; H04M 1/72436; H04M 1/72439; H04M 1/72547; H04M 1/7255; H04M 1/72552; H04M 1/72555
See application file for complete search history.

(56) References Cited

U.S. PATENT DOCUMENTS

| 5,923,318 A | * | 7/1999 | Zhai | G06F 3/0346 345/157 |
| 7,862,522 B1 | * | 1/2011 | Barclay | A61B 5/6806 600/595 |

(Continued)

FOREIGN PATENT DOCUMENTS

WO WO 2021/021092 A1 2/2021

OTHER PUBLICATIONS

Screen captures from YouTube video clip titled "Azeron Keypad Palmrests—All You Need to Know /w LatvianCAT", 2 pages, uploaded on Jan. 27, 2020 by user "@AzeronEU". Retrieved from Internet: Feb. 20, 2024 <https://www.youtube.com/watch?v=yUndGikOu-M>.

(Continued)

*Primary Examiner* — Bryan Earles

(57) ABSTRACT

A hand-wearable device outfitted with data interface electronics is provided. The device is secured to its user by means of a comfortable material integrated across the top of the hand. The device includes a central palm section containing complex three-dimensional geometry and modular features for adjustable structures to house switch sensors. These structures account for each fingertip's location and orientation relative to the rest of the user's hand. Features to accommodate the comfortable securing material are built into the device to ensure the device does not shift or move around relative to the user's hand while being worn and operated. Integrated switch sensor and various power and transistor-based electronics allow the device to function and communicate with other computers and like devices. The device is worn on the left, right, or both hands simultaneously to enable access to the maximum number of potential sensor commands for a user.

8 Claims, 5 Drawing Sheets

(56) References Cited

U.S. PATENT DOCUMENTS

| | | | | |
|---|---|---|---|---|
| 2002/0140668 A1* | 10/2002 | Crawford | ............ | G06F 3/03547 |
| | | | | 345/158 |
| 2003/0011503 A1* | 1/2003 | Levenson | ............. | G06F 3/0219 |
| | | | | 341/200 |
| 2005/0087603 A1* | 4/2005 | Koenck | ............... | G06F 3/04886 |
| | | | | 235/472.02 |
| 2009/0153485 A1* | 6/2009 | Bohn | ...................... | G06F 3/042 |
| | | | | 345/166 |
| 2016/0085076 A1* | 3/2016 | Hoellwarth | ............. | G06F 3/041 |
| | | | | 455/566 |
| 2018/0161670 A1* | 6/2018 | Boev | ........................ | A63F 13/24 |
| 2020/0363876 A1* | 11/2020 | Conley | ................. | G06F 3/0219 |
| 2022/0370896 A1* | 11/2022 | Ikeda | ...................... | G06F 3/011 |

OTHER PUBLICATIONS

Screen captures from YouTube video clip titled "Azeron Cyro—The device for one-handed gaming", 2 pages, uploaded on Nov. 15, 2022 by user "@AzeronEU". Retrieved from Internet: Feb. 20, 2024 <https://www.youtube.com/watch?v=_nOGanjHmfI>.

Screen captures from Youtube video clip and comments on video titled "Chorded Keyboard Prototype", 2 pages, uploaded on Sep. 7, 2017 by user "@grahamm2281", comments by users "@mic7427" and "@grahamm2281". Retrieved from Internet: Feb. 20, 2024 <https://www.youtube.com/watch?v=DJ65zWpcAhl>.

Screen captures from Youtube video clip titled "I built a mouse from scratch with 3-D printing and Arduino", 2 pages, uploaded on Mar. 1, 2024 by user "@benmakeseverything". Retrieved from Internet: Mar. 19, 2024 <https://www.youtube.com/watch?v=qmX8vL-GbxU>.

U.S. Appl. No. 11/012,842, filed Jul. 14, 2005, Cesar Mercier.

* cited by examiner

HAND INTERFACE DEVICE

BACKGROUND OF THE INVENTION

I) Input to switches contained within an existing device held by the hand is sub-optimal, since posture of grip of said device must be adjusted every time a different switch combination is used, unless a human-data interface device station remains stationary during use II) Wearing something is generally sub-optimal for a user unless
   a. the shape of that thing matches that of the user
   b. harnessing, if needed, is comfortable to user
   c. the thing itself does not interfere with range of motion of user III) 1-D="1-Dimensional", 2-D="2-Dimensional", 3-D="3-Dimensional"

BRIEF SUMMARY OF THE INVENTION

The combination of flush device-user palm surface compression along with individually placed and oriented sensor mounting structures directly under a user's fingertips enables a user the unprecedented ability to operate a data interface device with hundreds of commands available through manipulation of switch combinations directly below their fingertips without the user having to maintain a constrained posture or constant positioning of the hands during use. When worn, the device need not be held, looked at, or require re-positioning of the fingers or hand in order to achieve the desired input—whether during sensor operation, hand motion, or in-between use.

DETAILED DESCRIPTION OF THE INVENTION

Figure 1:
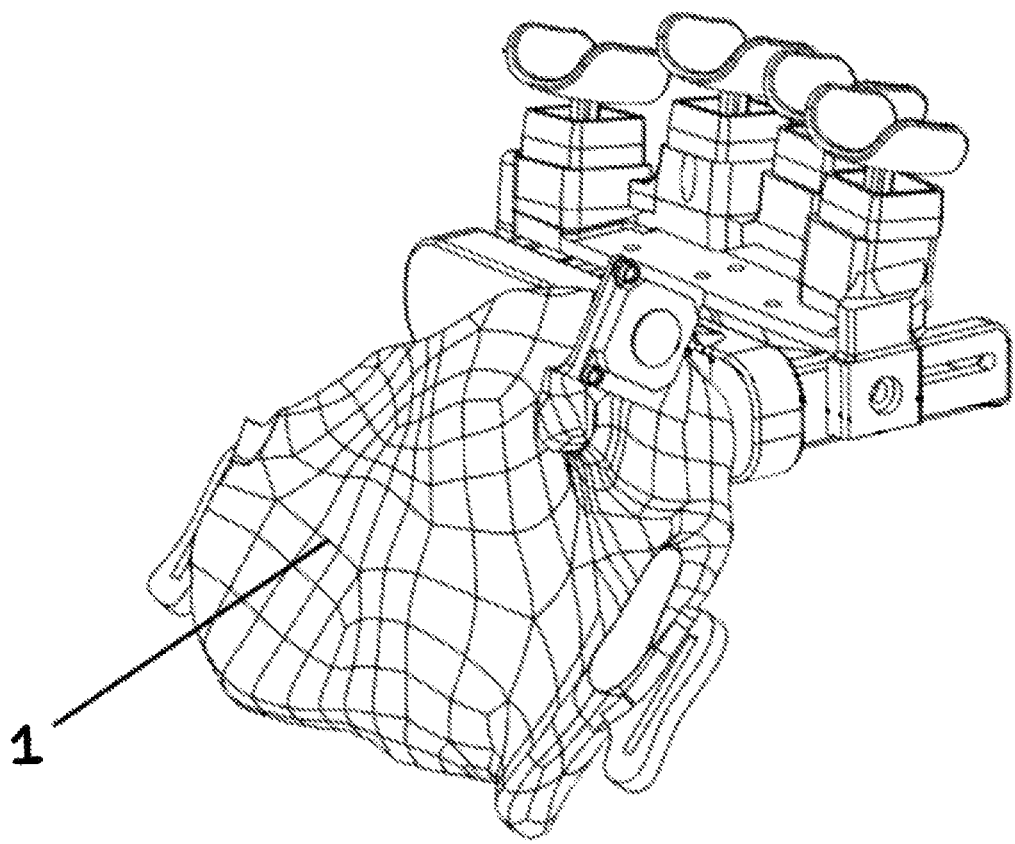
FIG. 1 shows a top-back-right perspective view of left-handed configuration of device.
Figure 2:
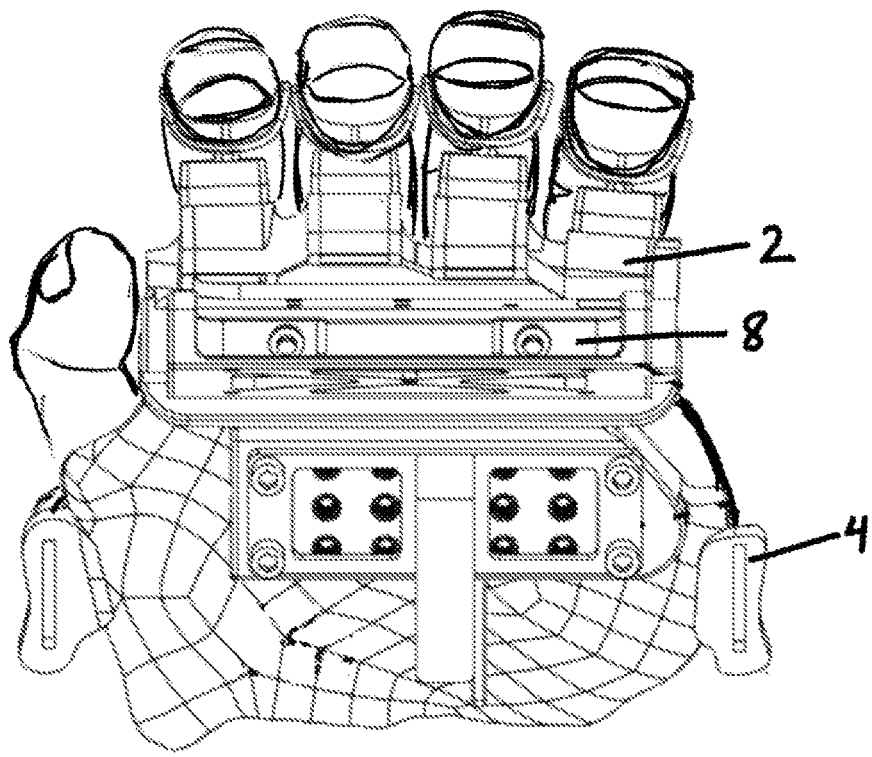
FIG. 2 shows a frontal view of the device while being worn by a left hand.
Figure 3:
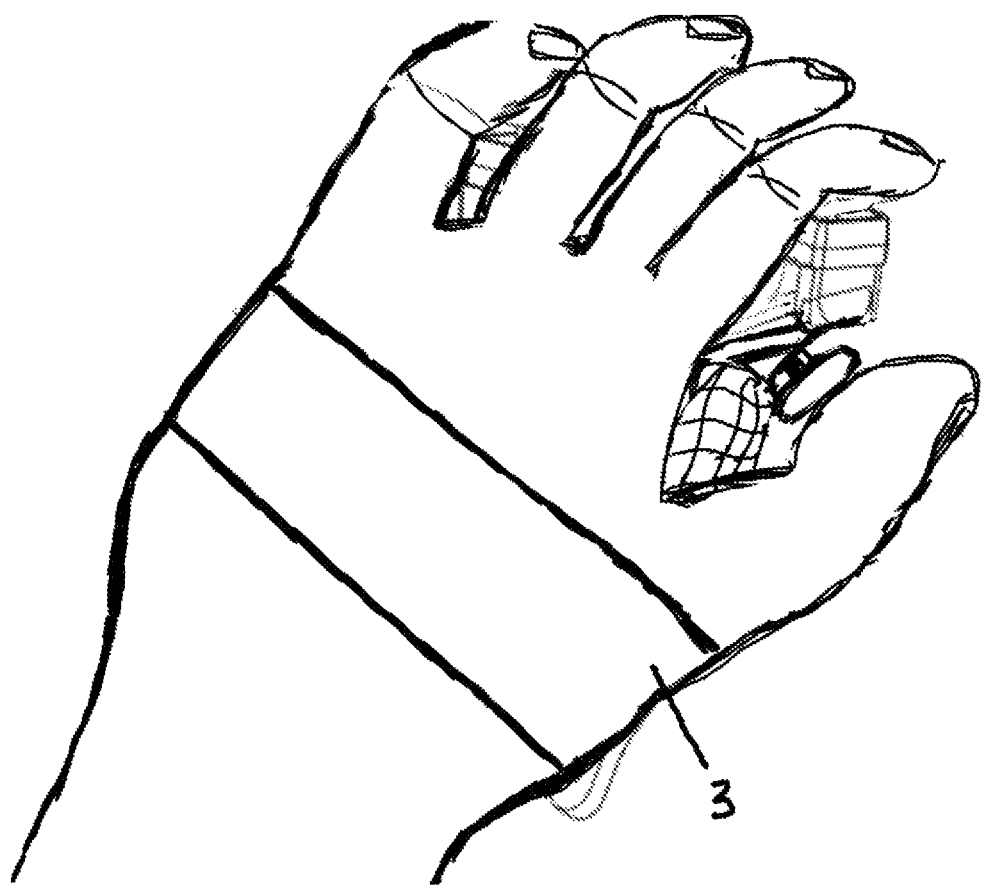
FIG. 3 shows a perspective view of the device while being worn by a left hand.

A) The present invention consists of a device that facilitates methods of interfacing with data B) The present invention includes a precise 3-D surface geometry of the human palm 1 as shown in FIG. 1 that can be measured from molding, impressions, 3-D scans, or other methods. This surface may be composed of rigid, semi rigid, or slightly flexible materials, with the ability to accommodate the below features
   i) The present invention may accommodate a palm-shaped textured insert into the main body to add extra friction that can contain a sparse pattern for a user's sweat fluid to collect and expel through C) The present invention includes a comfortable strap 3 as shown in FIG. 3 which may be lined with silicon or other high-friction material [or multiple straps] and slot features 4 as shown in FIG. 2 for said strap or straps to retain device on hand.

Figure 4:
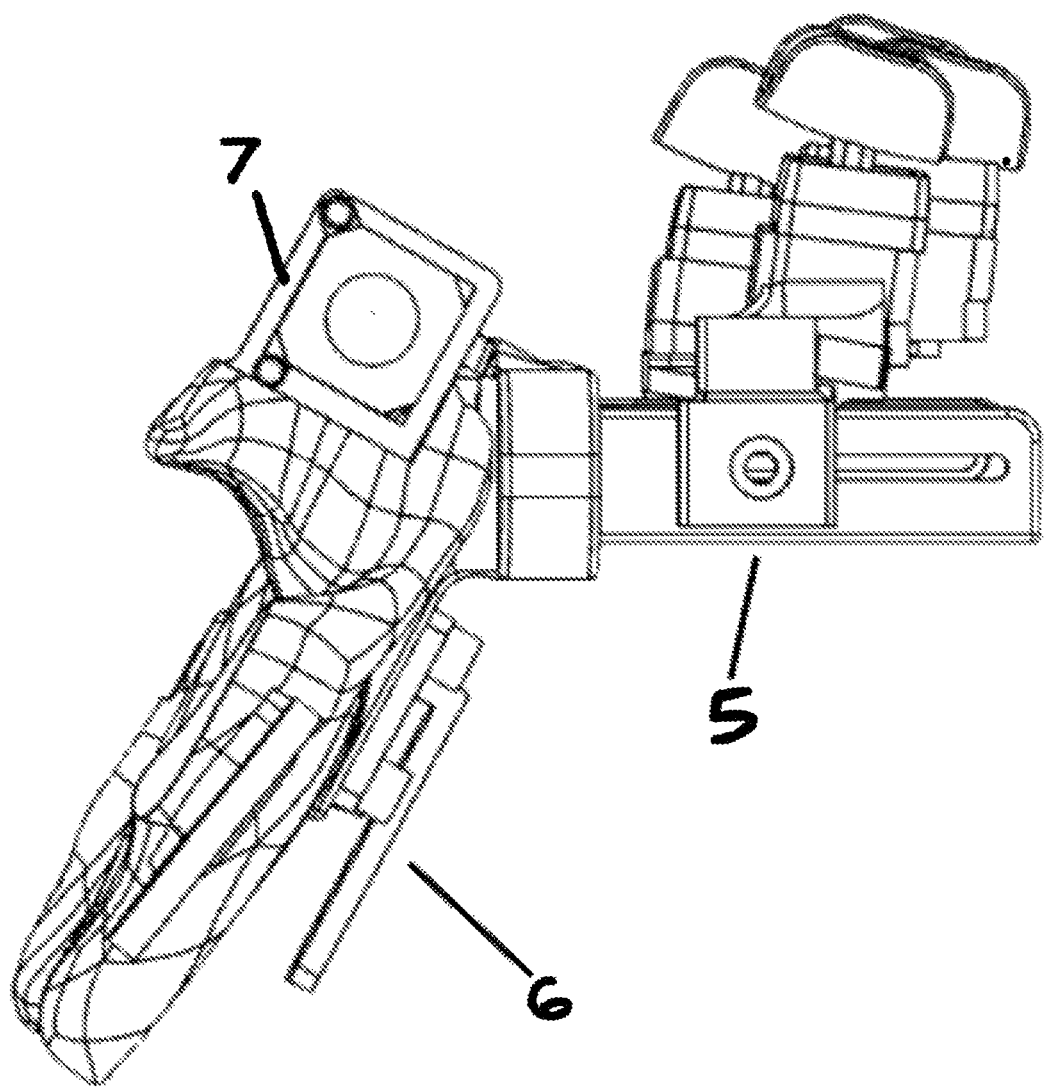
FIG. 4 shows a right view of the left-handed configuration of device.

D) The present invention includes structural mounting of a thumb stick 7 as shown in FIG. 4 or other 2-D analog control mechanism for cursor control or other 2-D, 1-D analog functionality. Instead of a 2-D switch, a user may include an additional 1-D switch under the thumb.

Figure 5:
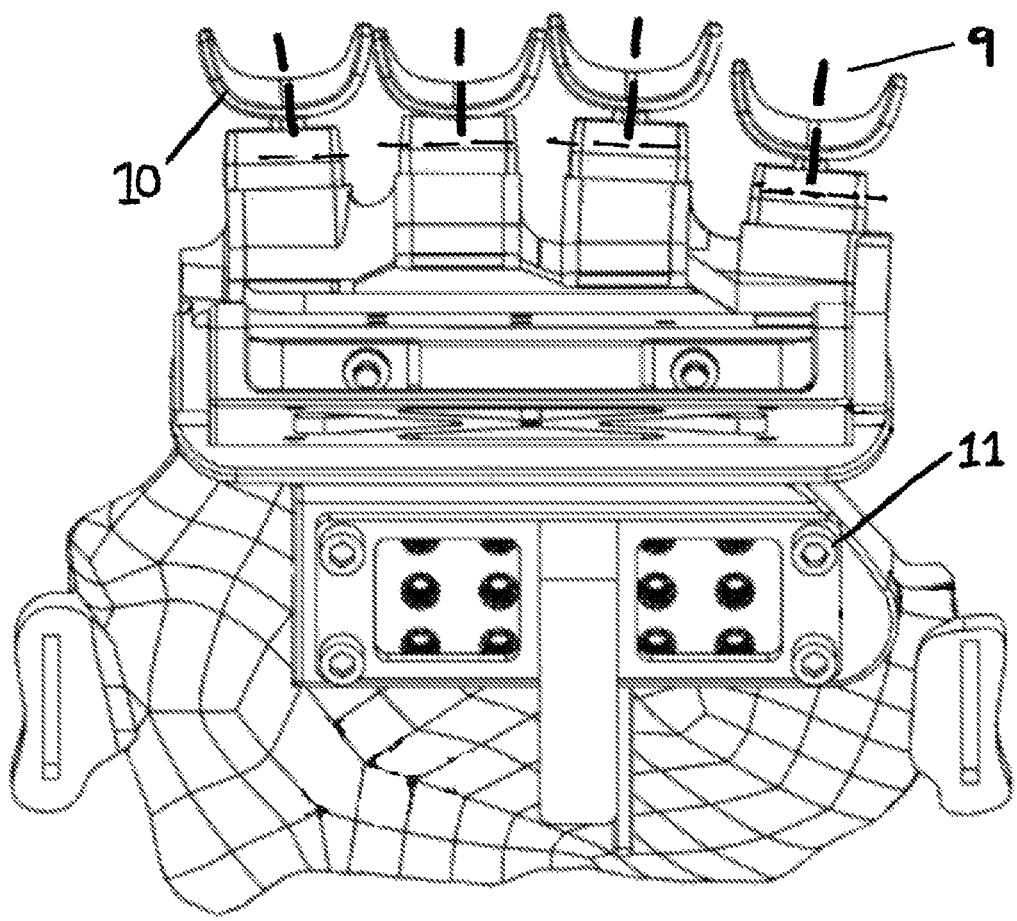
FIG. 5 shows a frontal view of the left-handed configuration of device.

E) The present invention includes crescent switch-caps 10 as shown in FIG. 5 to better contain fingertips on switches during operation.
   i) Each crescent switch cap may have and be assigned a color so that the pressing and releasing of colored switch caps in certain sequences results in different data commands F) The present invention includes angled hot-swappable switch slots located directly underneath in the natural resting position and orientation of each individual fingertip. The component 2 used for mounting these switch sensors can be seen in FIG. 2. The consequential individual orientations notated by switch orientation centerlines 9 as shown in FIG. 5
   i) When used in conjunction with spring-loaded switches, fingers may be returned to an un-pressed switch position with assistance from the springs within the switches G) The present invention includes modular features 8 as shown in FIG. 2 to enable detachment of switch sensor mounting components from the palm section slotted hardware features 5 as shown in FIG. 4 for adjusting the location and orientation of the switches in relation to the human palm geometry for varying user finger lengths H) The present invention includes modular mounting locations 11 as shown in FIG. 5 underneath the switch holder part and human palm geometry to allow for microcomputing hardware, haptic vibrational feedback, Bluetooth modules, inertial measurement unit, GPS module, battery, barcode scanner and/or grappling mechanism (shown in FIG. 3) for donning/doffing of present invention
   i) Shown grappling mechanism 6 as shown in FIG. 4 can be used to put on or take off devices with a mating receiver on a desk so another hand need not assist with these functions
   ii) User of the present invention with integrated Bluetooth or other wireless communication functions allows a user to not be constrained to keep hands in any constrained position relative to their body or workstation I) The present invention may be used on one hand at a time or with two devices/hands in tandem, which allows for greater variety of data interface through increased number of switches able to be manipulated J) The present invention, including the human palm geometry and other associated components, can be sized using various methods including but not limited to techniques by which an overlay of the user's hand onto a sheet with standardized sizes, since humans of different sizes have different sized hands though similar forms K) The present invention, with the combination of correctly placed switches and accommodating palm geometry allows for a rapid manipulation of switches in a user's hand, without that user having to adjust a hand grip/position.

L) The present invention can be used in conjunction with holographic glasses/augmented/visual reality technology M) The present invention can be used for Inventory taking tasks and control of industrial, commercial, and recreational computing devices N) The present invention can be used for walking or other types of motion while interfacing with data O) The present invention can be used for casual gaming, work, recreation, productivity activities P) The present invention, specifically in conjunction with a haptic feedback language module, may be useful to audio/vision-compromised individuals, elderly, those with limited dexterity, or a limited ability to stay still for extended periods.

What is claimed is:

1. A device wearable on a hand of a user, comprising:
    a wearing material with a means of retaining said device to said hand of said user absent application of a grasping force of said hand of said user upon said device;
    a body containing a surface in contact with a palmar surface of said hand of said user, wherein:
        said surface of said body in contact with said palmar surface of said hand of said user is three-dimensionally contoured to a three-dimensional surface geometry of said palmar surface of said hand of said user such that said surface of said body retains contact and alignment with said palmar surface of said hand of said user during operation absent application of a grasping force of said hand of said user;
    at least two variable-state interface boundaries operated by at least two hand digits of said user, wherein:
        a desired action by at least one said hand digit of said user relative to at least one said variable-state interface boundary changes at least one state of said variable-state interface boundary in a manner desired by said user;
        at least one said variable-state interface boundary is positioned in a three-dimensional location and oriented in a three-dimensional angular orientation relative to at least one friction ridge skin surface on each of at least two said hand digits of said user such that at least one said variable-state interface boundary is three-dimensionally approximately angularly aligned and three-dimensionally positioned to be approximately centered relative to at least one said friction ridge skin surface on each of two or more of said hand digits of said user absent application of a grasping, straightening, or intentional adjustment force and/or posture by said hand of said user upon said device.

2. The device in claim 1, wherein said device contains a means by which one or more changes to one or more said variable-state interface boundaries are physically fed back to said hand of said user absent application of a force by said hand of said user onto any object other than said device.

3. The device in claim 1, wherein said device contains a means for integrating electronic components.

4. The device in claim 1, wherein said device contains a means for adjusting at least one said position of one or more variable-state interface boundaries relative to at least one said position of at least one said friction ridge skin surface on at least one said hand digit of said user.

5. The device in claim 1, wherein an outer perimeter of said body containing said surface three-dimensionally contoured to a three-dimensional surface geometry of said palmar surface of said hand of said user is two-dimensionally contoured and constrained to an outer perimeter of said palmar surface of said user.

6. The device in claim 1, wherein said device contains a means to decelerate an accumulation of sweat between said user and said device during wearing.

7. The device in claim 1, wherein said device contains a means by which changes to one or more said variable-state interface boundaries enacted by one or more said hand digits of said user triggers a physical reaction within the device causing a return of surfaces to an initial state absent application of a force by said hand of said user onto any object other than said device.

8. The device in claim 1, wherein one or more said variable-state interface boundaries contain one or more means of retaining at least one said position of one or more said hand digits of said user relative to one or more said variable-state interface boundary.

* * * * *